(12) United States Patent
Shah et al.

(10) Patent No.: US 7,471,061 B2
(45) Date of Patent: Dec. 30, 2008

(54) METHOD AND APPARATUS FOR EXTENDING BATTERY LIFE IN REGULATED VOLTAGE APPLICATIONS

(75) Inventors: Shreya M. Shah, Austin, TX (US); Mohammed Hijazi, Austin, TX (US); Shiguo Luo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 11/385,457

(22) Filed: Mar. 21, 2006

(65) Prior Publication Data

US 2007/0222415 A1  Sep. 27, 2007

(51) Int. Cl.
 *H02J 7/00* (2006.01)
(52) U.S. Cl. .................................. 320/107; 307/66
(58) Field of Classification Search .............. 320/112, 320/116, 118, 119, 124, 135, 154, 103, 107; 307/43, 66, 77
See application file for complete search history.

(56) References Cited

U.S. PATENT DOCUMENTS

| | | | | |
|---|---|---|---|---|
| 3,489,915 A | * | 1/1970 | Engelhardt | 307/66 |
| 4,709,202 A | * | 11/1987 | Koenck et al. | 320/112 |
| 5,477,124 A | * | 12/1995 | Tamai | 320/135 |
| 5,523,671 A | | 6/1996 | Stewart | |
| 5,547,775 A | * | 8/1996 | Eguchi et al. | 320/118 |
| 5,576,609 A | | 11/1996 | Brown et al. | |
| 5,594,320 A | * | 1/1997 | Pacholok et al. | 320/103 |
| 5,598,041 A | * | 1/1997 | Willis | 307/43 |
| 5,621,301 A | * | 4/1997 | Allen et al. | 320/124 |
| 5,629,602 A | * | 5/1997 | Makino | 307/66 |
| 5,652,499 A | * | 7/1997 | Morita et al. | 320/112 |
| 5,731,686 A | * | 3/1998 | Malhi | 320/154 |
| 5,867,007 A | * | 2/1999 | Kim | 320/118 |
| 5,905,361 A | * | 5/1999 | Saeki et al. | 320/119 |
| 5,929,538 A | * | 7/1999 | O'Sullivan et al. | 307/66 |
| 5,982,142 A | * | 11/1999 | Sullivan et al. | 320/118 |
| 6,031,356 A | * | 2/2000 | Harada et al. | 320/119 |
| 6,037,756 A | * | 3/2000 | Pong | 323/222 |
| 6,137,265 A | | 10/2000 | Cummings et al. | |
| 6,153,947 A | * | 11/2000 | Rockow et al. | 307/64 |

(Continued)

OTHER PUBLICATIONS

Co-pending Application Entitled "AC-DC Adapter And Battery Charger Integration Scheme", U.S. Appl. No. 10/628,921, filed Jul. 29, 2003, 25 pgs.

(Continued)

*Primary Examiner*—Akm E Ullah
*Assistant Examiner*—M'Baye Diao
(74) *Attorney, Agent, or Firm*—O'Keefe, Egan, Peterman & Enders LLP

(57) ABSTRACT

A technique is disclosed for more fully utilizing the full voltage range of a battery driven battery output voltage when the battery output voltage is provided through voltage regulation circuitry. More particularly, when the battery output voltage drops to a level that is insufficient to support the desired output of the voltage regulation circuitry, the battery output voltage may be coupled to the voltage output in a manner bypassing at least a portion of the voltage regulation circuitry. In this manner additional voltage range of the battery output voltage may be utilized while still maintaining an output voltage within a desired output voltage range. In one embodiment, such a technique may be utilized in an uninterruptible power supply system.

20 Claims, 3 Drawing Sheets

U.S. PATENT DOCUMENTS

| | | | | |
|---|---|---|---|---|
| 6,163,086 | A * | 12/2000 | Choo | 307/43 |
| 6,452,362 | B1 * | 9/2002 | Choo | 320/116 |
| 6,518,731 | B2 * | 2/2003 | Thomas et al. | 320/136 |
| 6,608,403 | B2 * | 8/2003 | Liu et al. | 307/77 |
| 7,327,119 | B2 * | 2/2008 | Stephenson, III | 320/103 |
| 2002/0030412 | A1 * | 3/2002 | Lucas et al. | 307/66 |
| 2004/0195996 | A1 | 10/2004 | Nishida | |

OTHER PUBLICATIONS

Co-Pending Application Entitled "Systems And Methods For Regulating Pre-Charge Current In A Battery System", U.S. Appl. No. 11/034,624, filed Jan. 13, 2005, 26 pgs.

Microchip, Pic12F629/675 Data Sheet, 8-Pin Flash-Based 8-Bit CMOS Microcontrollers, 2003, 132 pgs.

Max1935, "500mA, Low-Voltage Linear Regulator in Tiny QFN", http://www.maxim-ic.com/quick_view2.cfm/qv_pk/3630; printed from Internet on Feb. 4, 2006; 2 pgs.

Micrel, MIC5235, "Ultra-Low Quiescent Current, 150mA, μCap LDO Regulator", Feb. 2005, 1-9 pps.

Maxim Integrated Products, "500mA, Low-Voltage Linear Regulator in Tiny QFN", MAX1935, Oct. 2002, 1-10 pps.

Webopedia, "What is UPS?", http://www.webopedia.com/term/u/ups.html; Printed from the Internet on Feb. 4, 2006, 1 pg.

Dallas Semiconductor Maxim, "Electrical Engineering Glossary Definition For LDO", http://www.maxim-ic.com/glossary.index.cfm/ac/v/id/194/tm/ldo/in/en; Printed from the Internet on Oct. 21, 2005, 1 pg.

* cited by examiner

METHOD AND APPARATUS FOR EXTENDING BATTERY LIFE IN REGULATED VOLTAGE APPLICATIONS

TECHNICAL FIELD OF THE INVENTION

This invention relates to techniques for supplying battery power through voltage regulators and more particularly to extending the battery life in such applications.

BACKGROUND

Battery supported power supplies are used for a variety of applications. Often a battery output voltage must be regulated prior to being utilized in a system. For example, as shown in FIG. 1 an information handling system 100 may include a battery power source 110 which supplies a battery output voltage Vbat 120. The battery output voltage Vbat 120 may be coupled to a voltage regulator 130 which generates at the output terminal a regulated voltage Vreg 140 from the battery output voltage Vbat. The regulated voltage Vreg may be provided to a variety of other system components 150.

A wide range of types of systems may include circuitry such as shown in FIG. 1, one such system is an information handling system. As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a typical application of the circuitry of FIG. 1, the battery output voltage Vbat may have a varying voltage range that is typically higher and less controlled than the desired power supply voltage range required by the other system components 150 of the information handling system. Thus the voltage regulator regulates the Vbat voltage 120 to the desired level necessary for the proper operation of the other system components 150. For example, the Vbat voltage may range for 4.2V to 3.0V over the life of a battery and it may be desired that the Vreg voltage range be 3.3V to 3.0V at the output voltage terminal. As used herein "battery life" refers to the useful charge life of a single charge of the battery. However, most voltage regulation circuitry requires some differential between the input voltage and the output voltage. Thus, if the Vbat voltage drops to 3.0V, the voltage regulator 130 may only be able to supply a regulated voltage Vreg that is less than 3.0 V. In this fashion, the full voltage range of the Vbat voltage 120 may not be useable as at the low end of the voltage range the voltage may not be sufficiently high to support the required Vreg voltage levels.

One application of voltage regulators in information handling system such as shown in FIG. 1 is provide an uninterruptible power supply (UPS) that includes a battery power supply source and other system power supply sources (such as sources derived from AC power provided from the public power grid). Typically the battery power source may be provided to maintain power in the event the system power supply sources are not available. Such a system that may be formed in an information handling system is shown in FIG. 2. FIG. 2 illustrates the power supply inputs and outputs for a voltage regulation circuit that may be used to form an UPS. As shown in FIG. 2, in addition to the battery output voltage Vbat 120 provided at one terminal as shown, two additional output voltages V1 220 and V2 222 are provided at the output terminals of a first and second power supply respectively. (for example 5V power sources). Diodes 226 are provided between the output voltages and a voltage regulator 230 as shown. The voltage regulator 230 may be a low-dropout (LDO) linear voltage regulator which may operate when the input voltage barely exceeds the desired output voltage. The voltage regulator 230 provides the regulated voltage Vreg 140. As shown, the voltage regulator 230 may include a voltage input IN, a voltage output OUT, and a shutdown/enable input SHDN to shutdown the regulator and to disable the output Vreg power supply. A wide range of LDO voltage regulators are known in the art, such as for example, the Maxim MAX1935 or the Micrel MIC5235.

Using the exemplary voltage levels described above with reference to FIG. 1, the battery output voltage Vbat may vary from 4.2V to 3.0V. In typical applications the voltage drop across the diodes may be 0.35V and the voltage regulator 230 may require an input voltage that is 0.25V greater than the desired output voltage. To achieve the minimum desired Vreg voltage level of 3.0V, the input voltage at the IN input must be at least 3.25V and the corresponding minimum Vbat voltage level must be 3.6V. Thus, when the battery discharges such that Vbat is less than 3.6V the battery will no longer support the required Vreg voltage range. In such circumstances, the discharge capacity of the battery from 3.6V to 3.0V is not utilized and hence the battery life will be reduced. This is exacerbated considering that the average battery life loss is between 15 to 30% of the total battery life depending upon discharge characteristics of the battery cell type being utilized.

SUMMARY OF THE INVENTION

A method and system are disclosed for more fully utilizing the full voltage range of a battery driven output voltage when the battery output voltage is provided through voltage regulation circuitry. More particularly, when the battery output voltage drops below a level sufficient to support the desired output of the voltage regulation circuitry, the battery output voltage may be coupled to the voltage output in a manner bypassing at least a portion of the voltage regulation circuitry. In this manner additional voltage range of the battery output voltage may be utilized while still maintaining an output voltage within a desired output voltage range. In one embodiment, such a technique may be utilized in an uninterruptible power supply system.

In one embodiment, a method of extending the battery life of a battery source in a power supply system having voltage regulation is provided. The method may include providing a battery generated first voltage to voltage regulation circuitry and utilizing the voltage regulation circuitry to generate a regulated voltage from the battery generated first voltage and to couple the regulated voltage to an output voltage supply terminal. The method may further include monitoring a condition of the power supply system, the condition indicative of a state of the battery generated first voltage. The method may further include selectively bypassing at least a portion of the voltage regulation circuitry so as to couple the battery generated first voltage to the output voltage supply terminal, the selectively bypassing being performed in response to the monitoring of the condition of the power supply system. By performing the selectively bypassing step, the battery life of the battery source may be extended.

In another embodiment, a method of extending the battery life of a multi-source power supply system having at least one battery source is provided. The method may include providing a battery output voltage derived from a battery source and providing at least one other voltage derived from a source other than the battery source. The method further includes providing at least one system voltage supply that is derived at least at times from the battery output voltage. The method still further may include coupling the battery output voltage to the system voltage supply through at least one voltage drop device which provides a voltage drop. Further the method includes selectively bypassing the at least one voltage drop device when the voltage of the battery output voltage drops below a first voltage level such that the battery output voltage may be coupled to the system voltage supply via a path that bypasses the voltage drop device. According to the method the selectively bypassing of the at least one voltage drop device allows the system voltage supply to be continued to be derived from the battery output voltage in a manner extending the useful charge of the battery.

In another embodiment, an information handling system is provided. The information handling system may include at least one battery power source and at least one battery power output voltage derived from the battery power source. The information handling system may further include a voltage regulator, the battery power output voltage coupled to an input of the voltage regulator. A system power supply rail coupled to an output of the voltage regulator is also provided. The system may further include at least one switch coupled between the battery power output voltage and the system power supply rail, the at least one switch providing a bypass path around at least a portion of the voltage regulator. The system may also include switch control circuitry coupled to the at least one switch and the at least one battery power output voltage, the switch control circuitry responsive to a state of the battery power output voltage. By utilizing the bypass path the battery life of the battery power source may be extended.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 3:
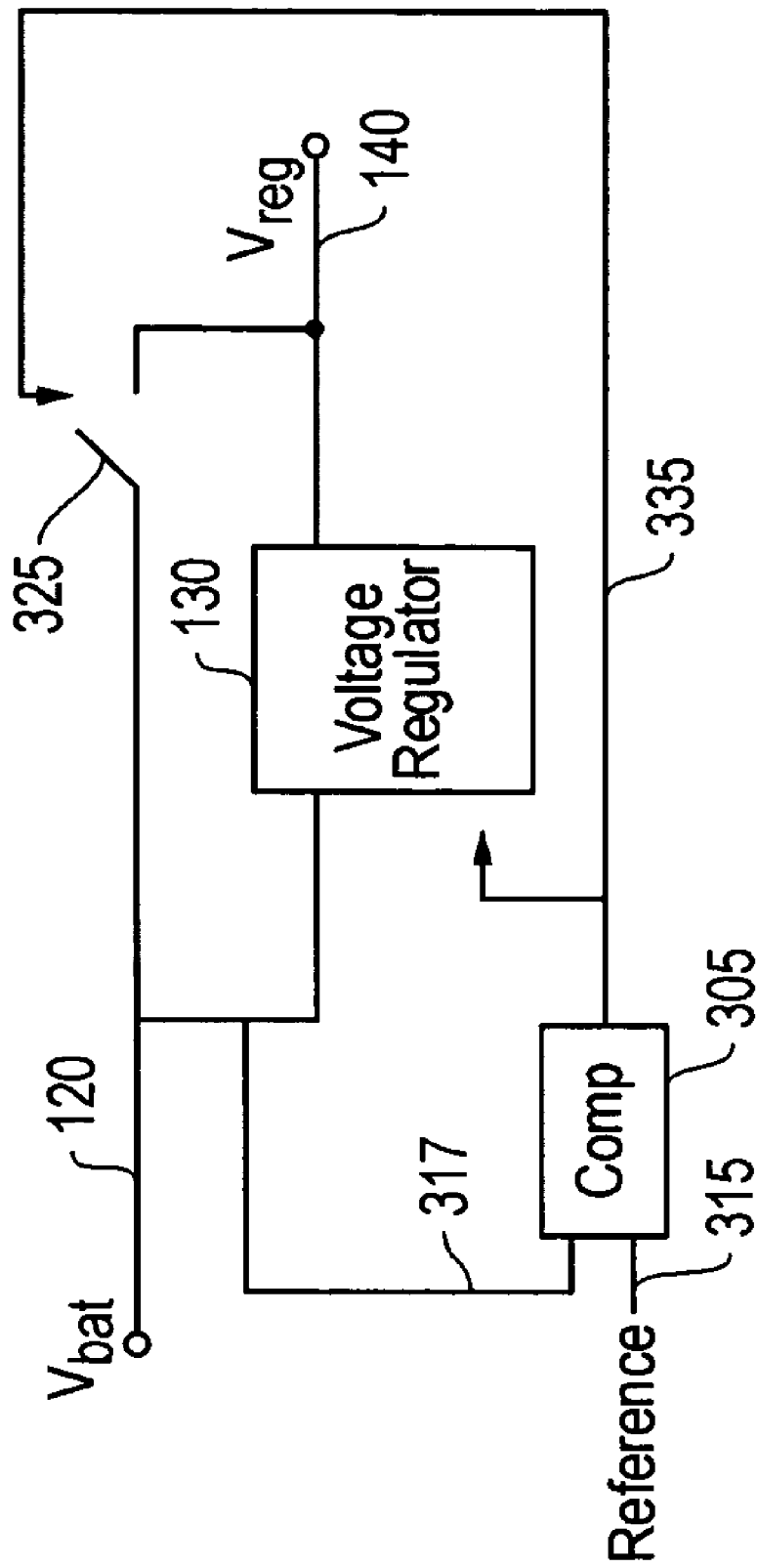
FIG. 3 illustrates an exemplary block diagram for regulating a battery power supply in an information handling system in a manner to more fully utilize the battery power supply.

FIG. 3 illustrates an exemplary embodiment of circuitry that may be used in an information handling system that utilizes the advantageous techniques disclosed herein. Some or all the components of FIG. 3 may, in one example, be a part of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
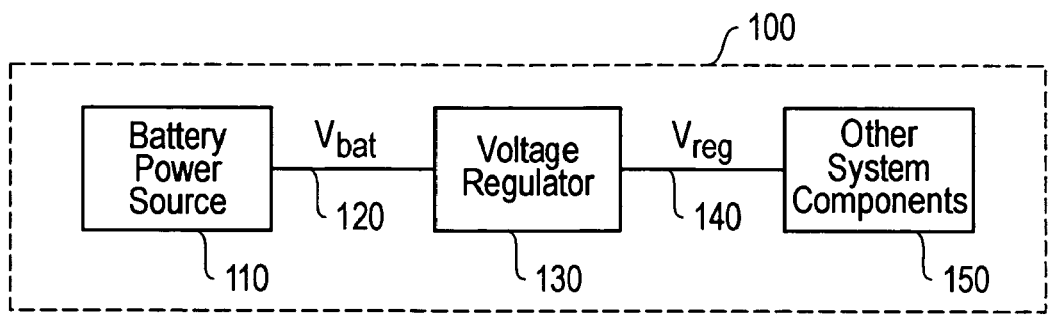
FIG. 1 illustrates a prior art information handling system having a battery power supply and voltage regulation

As shown in FIG. 3, battery output voltage Vbat 120 may be coupled to a voltage regulator 130 that provides a regulated voltage Vreg 140 at an output terminal. Though not shown, it will be understood that the Vbat may be coupled to a battery power source and that the output Vreg of voltage regulator may supply other system components such as utilized in an information handling system as described above with reference to FIG. 1. Thus the regulated voltage Vreg of the regulator 130 may be provided at the output terminal to be utilized as a system power supply rail. The circuitry of FIG. 3 may further include a comparator 305, a reference voltage 315, comparator output signal 335 and a switch 325 as shown.

In operation, the comparator 305 may use two inputs, a first input 317 and a reference voltage 315. The first input 317 is could be from the battery power source that is provided as an input to the voltage regulator 130. The comparator 305 may monitor and compare the voltage presented at the first input 317 and the reference voltage 315 (or some voltage level related to the reference voltage 315). Thus the comparator 305 is one type of monitoring circuit that may identify the voltage level of voltage regulator 130 input voltage. It will be recognized that other types of monitoring circuits may also be utilized to monitor other states of the battery power source (for example current may be monitored).

The comparator output signal 335 is provided to control the open or closed state of switch 325 and to also provide a shutdown/enable signal to the voltage regulator 130. The reference voltage 315 and the comparator are designed to provide an output signal that is indicative of whether or not the battery output voltage Vbat 120 is sufficient such that a sufficient regulated voltage Vreg 140 may be sustained at the output of the voltage regulator 130. Thus, when Vbat 120 is at a voltage level sufficient such that a sufficient regulated voltage Vreg 140 may be obtained, the comparator output signal is in a state that enables the voltage regulator to operate normally and maintains the switch 325 in an open condition. However, when the voltage at Vbat 120 drops to a level such that the voltage regulator 130 no longer may support a sufficiently high regulated voltage at Vreg 140, the state of the comparator output signal 335 switches such that the battery output voltage Vbat 120 may be directly applied to the Vreg 140 power supply line in a manner bypassing the voltage regulator 130. Thus when the state of the comparator output signal 335 indicates a low Vbat 120 voltage level, the comparator output signal may control the switch 325 to close and turn the voltage regulator 130 to shutdown.

Again using the exemplary voltage levels described above, when the voltage provided from the battery output voltage Vbat to the input of the voltage regulator is above 3.25V, the system of FIG. 3 is in a state such that switch 325 is open and the Vreg voltage is obtained through the voltage regulator 130. However when the input voltage to the voltage regulator 130 drops below 3.25V, the comparator 305 which is monitoring the input voltage level senses a low input voltage level and provides the appropriate output signal (or signals) that will disable the voltage regulator output and close switch 325.

Figure 4:
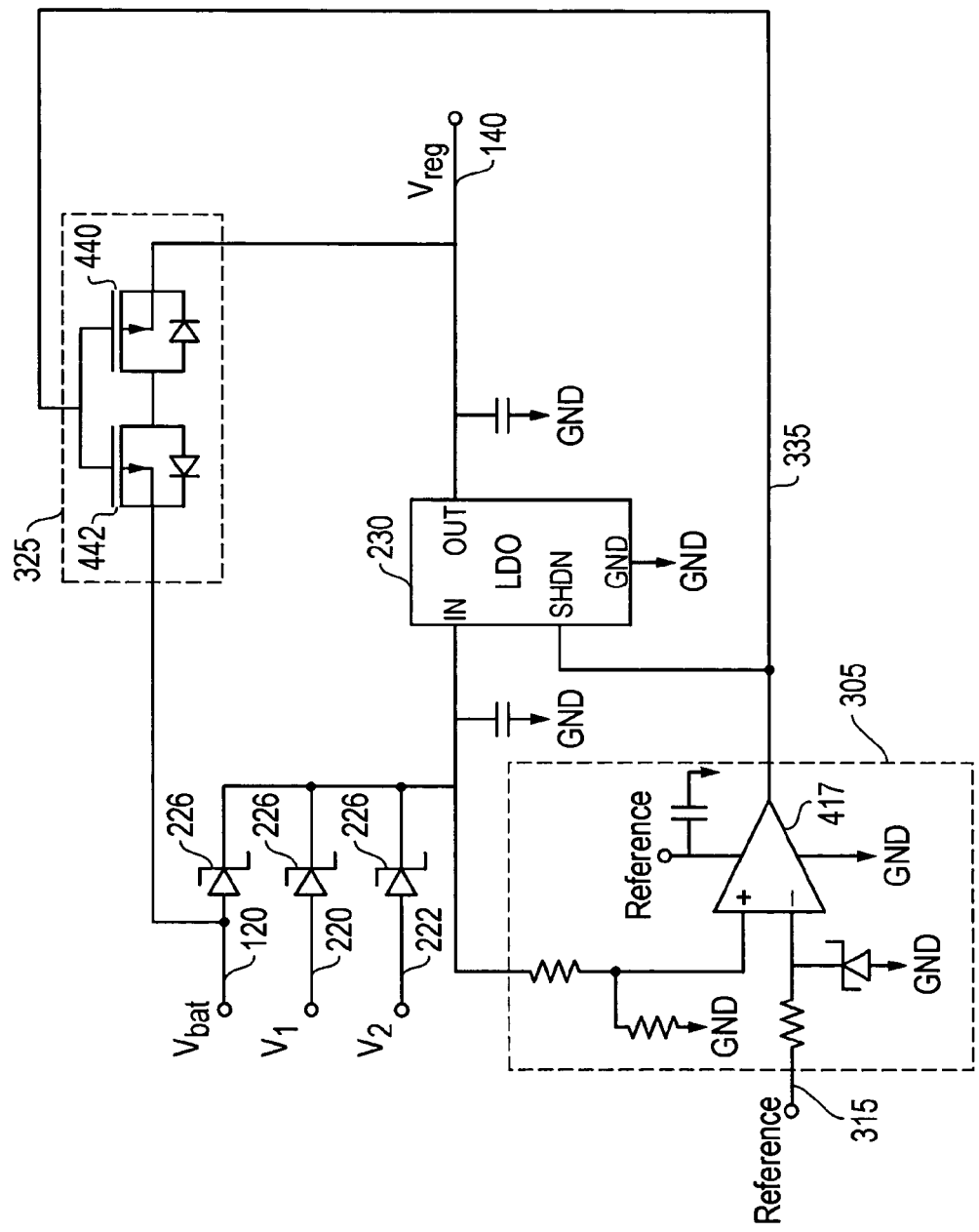
FIG. 4 illustrates another exemplary circuit for regulating a battery power supply in an information handling system in a manner to more fully utilize the battery power supply.

FIG. 4 illustrates another exemplary embodiment of circuitry that may be used in an information handling system that utilizes the advantageous techniques disclosed herein. As shown in FIG. 4, an UPS embodiment may be provided. Thus, one or more power supply rails that are generated from AC based power sources may be provided along with a battery power source in a manner such that the battery power supply may provide an alternative power supply, for instance when no AC power source is available.

Figure 2:
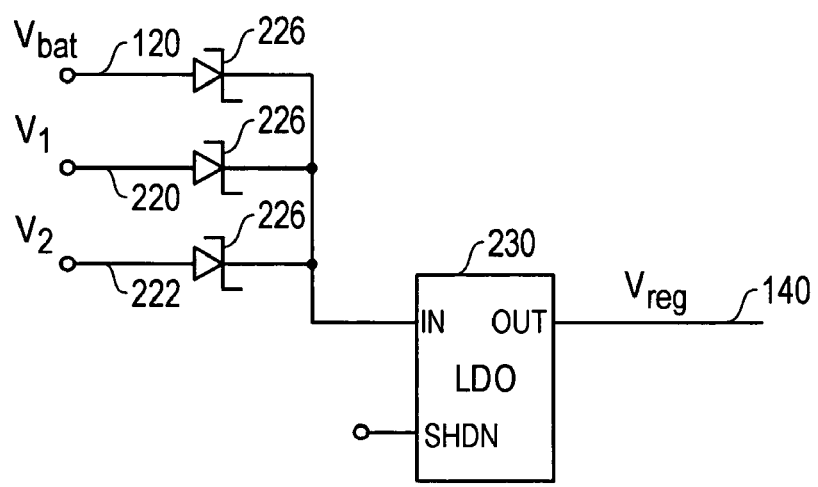
FIG. 2 illustrates a prior art UPS having voltage regulation that may be utilized in an information handling system.

As/shown in FIG. 4, Vbat 120, V1 220, V2 222, diodes 226, voltage regulator 230, and Vreg 140 may be provided similar to as in FIG. 2. As mentioned above, the voltage regulator 230 may be one of a number of types of voltage regulators. Exemplary regulators may include the Maxim MAX1935 or the Micrel MIC5235. The switch 325 and comparator 305 of FIG. 4 operate to implement the functionality explained above with reference to FIG. 3.

The switch 325 of FIG. 4 may be comprised of two P-channel mosfet switching elements 442 and 440 arranged in a back to back arrangement as shown. As configured, the two FET switches will turn on and off together in response to the comparator output signal 335. The use of two FET switching elements in the manner shown will block current flow in either direction when the switch 325 is in the open state.

The comparator 305 may be implemented either by a microcontroller or by an operation amplifier 417 so as to monitor the input voltage level of the voltage regulator 230 as shown. As known in the art, the reference voltage 315 and the comparator resistors may be selected to be the appropriate values such that the state of the comparator output signal changes when the voltage IN input of the voltage regulator 230 drops below a predetermined level. In this manner a voltage that is indicative of a condition of the battery is compared to an internal comparator voltage level in a manner such that the comparator output is indicative of the condition of the battery.

As shown in FIG. 4, the bypass path for the battery output voltage Vbat is configured so as to bypass both the diode 226 and the voltage regulator 230. In this manner the voltage drop across both the diode 226 and the voltage regulator 230 may be avoided.

Once again using the exemplary voltage levels described above (and assuming a voltage drop of 0.35V across diodes 226 and a voltage drop across the voltage regulator 230 of 0.25V), initially switch 325 will be open and when the voltage at the pin IN of the voltage regulator drops below 3.25V the comparator 305 of FIG. 4 will detect such a change. At such time the comparator output signal 335 may then be set to a state such that switching elements 440 and 442 will be switched from an open state to a closed state. In addition, the comparator output signal 335 will be provided to the shutdown pin SHDN of the voltage regulator 230 so as to disconnect the Vreg output 140 from the voltage regulator 230. As a result, Vreg will be directly supported by passed Vbat.

Thus the diode 226 and the voltage regulator 230 will be bypassed allowing an additional voltage range of the battery power source battery output voltage Vbat to be utilized. In the example described above, when the battery discharges such that the battery power supply rail drops below 3.6V (a level of 3.25V at the voltage regulator input) the bypassing will take effect. The battery source voltage Vbat may then still be utilized while the battery further discharges and the battery power supply rail drops from 3.6V to 3.0V since the specified required Vreg voltage level ranges from 3.6V to 3.0V. In this manner the battery life utilization may be extended as much as up to 25% (depending on battery type and characteristics) as compared to the prior art techniques.

It will be recognized with the benefit of this disclosure that the concepts described above may be implemented in a variety of manners and that the particular circuits and techniques described herein are merely exemplary. For example, the circuitry of FIGS. 3 and 4 may all be integrated within a voltage regulator integrated circuit. Thus, the voltage monitoring and the switch bypassing of at least a portion of the voltage regulation circuitry may be performed internal to an LDO voltage regulator. Additionally, voltage monitoring and regulator control can be implemented by a microcontroller.

In another alternative, the monitoring of the battery output voltage Vbat may be accomplished by circuitry embedded in the battery control and charging circuitry. Thus rather than monitoring the voltage at the input to the voltage regulator, the voltage levels at the output of the battery power source may be monitored. In such an embodiment, the battery control logic may provide the control signal indicating that the voltage regulation should be bypassed. The bypassing may occur through a switch external to the voltage regulator such as shown in FIG. 3 or 4 or the bypassing may occur through a switch internal to the voltage regulator. In such a case an additional control input may be provided to the voltage regulator to indicate that the IN input voltage should be more directly connected to the OUT output voltage (or alternatively such a condition could be set to occur whenever the voltage regulator is put in the shutdown state through the shutdown input SHDN).

It will also be recognized that other system voltages may be monitored to indicate when the bypassing effect should commence. Thus for example, intermediate nodes between the battery output voltage Vbat and the voltage regulator and/or the battery could be monitored. Further, even the output voltage of the regulator could be monitored to assist in determining when to commence bypassing. Likewise it will be recognized that a more direct connection between the battery output voltage Vbat and the voltage Vreg may be accomplished in a variety of manners and the direct connection between a switch as shown herein is but one approach of many circuit approaches that may be utilized.

In yet another alternative, more than one control signal may be generated as a result of monitoring the voltage levels on the input side of the voltage regulator (such as Vbat or at the IN input of the voltage regulator). In addition, though described herein with reference to the voltage regulator being shut down when a low battery input voltage is detected, alternatively the voltage regulator could remain enabled and an external switch could be controlled to disconnect the voltage regulator from the Vreg power supply rail.

It will also be recognized that the concepts of the present invention will be useful in conjunction with circuitry other than voltage regulators. Thus for example, the voltage regulator may be considered as an example of a voltage drop device in which the battery power supply voltage is subjected to a voltage drop when the battery supplied power passes through the voltage drop device. Thus, the selective bypassing techniques described above may be utilized to bypass a variety of types of voltage drop devices and in such uses the advantages of the techniques described herein may be obtained.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example equivalent elements may be substituted for those illustrated and described herein and certain features of the invention may be utilized independently of the use of other features, all as would be apparent to one skilled in the art after having the benefit of this description of the invention.

What is claimed is:

1. A method of extending a useful charge life of a single charge of a battery source in a power supply system having voltage regulation, the method comprising:
   providing a battery generated first voltage to voltage regulation circuitry;
   utilizing the voltage regulation circuitry to generate a regulated voltage from the battery generated first voltage and to couple the regulated voltage to an output voltage supply terminal;
   monitoring a condition of the power supply system, the condition indicative of a state of the battery generated first voltage; and
   selectively bypassing at least a portion of the voltage regulation circuitry so as to selectively couple the battery generated first voltage to the output voltage supply terminal when the selectively bypassing occurs, the selectively bypassing being performed in response to the monitoring of the condition of the power supply system,
   wherein the selectively bypassing enables the useful charge life of the single charge of the battery source to be extended.

2. The method of claim 1 wherein the condition of the power supply system being monitored is a voltage level of the first voltage.

3. The method of claim 1 wherein the selective bypassing is achieved at least in part by coupling the first voltage to the output voltage supply terminal through circuitry that comprises a switch.

4. The method of claim 3 wherein the first voltage and the output voltage supply terminal are coupled through circuitry that comprises a switch.

5. The method of claim 3 wherein the useful charge life of the single charge of the battery source is extended by using a wider voltage range of the first voltage than is achievable without the selectively bypassing step.

6. The method of claim 1 wherein the monitoring comprises comparing a voltage level of the first voltage to a predetermined voltage level, the method further comprising switching the first voltage in connection with the output voltage supply terminal based upon the comparing of the voltage level of the first voltage to the predetermined voltage level.

7. The method of claim 6 wherein the useful charge life of the single charge of the battery source is extended by using a wider voltage range of the first voltage than is achievable without the selectively bypassing step.

8. A method of extending a useful charge life of a single charge of a multi-source power supply system having at least one battery source, the method comprising:
   providing a battery output voltage derived from a battery source;
   providing at least one other voltage derived from a source other than the battery source;
   providing at least one system voltage supply that is derived at least at times from the battery power supply;
   coupling the battery power supply to the system voltage supply through at least one voltage drop device which provides a voltage drop so that there is a voltage difference between the battery power supply and the system voltage supply;
   selectively bypassing the at least one voltage drop device when the voltage of the battery output voltage drops below a first voltage level such that the battery output voltage may be coupled to the system voltage supply via a path that bypasses the voltage drop device,
   wherein the selectively bypassing of the at least one voltage drop device allows the system voltage supply to be continued to be derived from the battery output voltage in a maimer extending the useful charge life of the single charge of the battery.

9. The method of claim 8 wherein the voltage drop device is a low dropout voltage regulator.

10. The method of claim 9 wherein the selective bypassing is achieved through a switch that is controlled based at least in part by a monitoring circuit that monitors a voltage level of the battery output voltage.

11. The method of claim 10 wherein the selective bypassing allows a wider voltage range of the battery output voltage to be used for generating the system voltage supply.

12. The method of 10 wherein the low dropout voltage regulator is shutdown when the selective bypassing occurs.

13. An information handling system comprising:
   at least one battery power source;
   at least one battery power output voltage derived from the battery power source;
   a voltage regulator, the battery power output voltage providing an input of the voltage regulator;
   a system power supply rail coupled to an output of the voltage regulator, a voltage differential existing between the input of the voltage regulator and the system power supply rail;
   at least one switch coupled between the battery power output voltage and the system power supply rail, the at least one switch providing a bypass path around at least a portion of the voltage regulator;
   switch control circuitry coupled to the at least one switch and the at least one battery power output voltage, the switch control circuitry responsive to a state of the battery power output voltage,
   wherein utilizing the bypass path extends a useful charge life of a single charge of the battery power source.

14. The information handling system of claim 13 further comprising a plurality of input voltages being coupled to the input of the voltage regulator, the battery power output voltage being one of the plurality of input voltages and at least one other of the plurality of input voltages being generated from an AC power source.

15. The information handling system of claim 13 wherein a shutdown node of the voltage regulator is also coupled to the switch control circuitry, the voltage regulator being shutdown when the bypass path is utilized.

16. The information handling system of claim 13 wherein the state of the battery power output voltage is indicative of a low voltage level of the battery power output voltage.

17. The information handling system of claim 16 wherein the switch control circuitry comprises circuitry that compares a voltage level of the battery power output voltage to comparator reference voltage level.

18. The information handling system of claim 16 wherein the switch and bypass path are formed within the voltage regulator.

19. The information handling system of claim 18 wherein the switch control circuitry comprises a comparator formed within the voltage regulator.

20. The information handling system of claim 16 wherein the state of the battery power output voltage is determined by circuitry external to the voltage regulator.

* * * * *